United States Patent

[11] 3,608,834

[72] Inventor David S. MacLaren
 21176 Brantley Raod, Shaker Heights, Ohio 44120
[21] Appl. No. 756,500
[22] Filed Aug. 30, 1968
[45] Patented Sept. 28, 1971

[54] GAS DIFFUSER
 1 Claim, 5 Drawing Figs.

[52] U.S. Cl. ................................................. 239/571,
 137/516.17, 137/525.3, 239/568
[51] Int. Cl. .................................................... B05b 1/30
[50] Field of Search ....................................... 261/119–125;
 137/525.3, 525.5, 516.17; 239/559,
 567, 568, 571

[56] References Cited
 UNITED STATES PATENTS

| | | | |
|---|---|---|---|
| 2,359,025 | 9/1944 | Durdin | 261/124 |
| 2,616,676 | 11/1952 | Walker | 261/124 |
| 2,986,383 | 5/1961 | Lowry | 261/124 |
| 3,276,698 | 10/1966 | Wood | 261/124 |
| 3,294,380 | 12/1966 | Born | 261/121 |
| 3,334,819 | 8/1967 | Olavson | 261/121 |
| 3,463,189 | 8/1969 | Fitzpatrick | 137/525.3 |

FOREIGN PATENTS

| 540,589 | 5/1957 | Canada | 137/525.5 |
|---|---|---|---|

*Primary Examiner*—Frank W. Lutter
*Assistant Examiner*—Bernard Wozick
*Attorney*—Woodling, Krost, Granger and Rust ABSTRACT: An air diffuser for use in a sewage treatment tank in combination with an air supply conduit. The air diffuser comprises a body member with an opening therein extending therethrough from an inlet side to an exit side. Valve means are located in the opening intermediate the inlet and exit sides and is movable between open and closed positions. The body member is provided with means for attaching the same to the air supply conduit in gas-conducting relationship therewith in such a position that the exit side of the body member may be located vertically below or above the inlet side. Introduction of pressurized air to the air supply conduit and to the inlet side of the body member causes the valve means to open with subsequent passage of air to the exit side of the body member and the exit side of the body member is preferably formed into a chamber of a substantially larger volume than the inlet side. A plurality of notches or slots or holes is provided in the peripheral edge on the exit side of the opening and this tends to let the air escape into the sewage in small bubbles. When the pressurized air is shut off, the gas trapped between the slots and the valve means tends to hold the valve means closed and this trapped volume of air also keeps liquid sewage from traveling back to the valve means and to the air supply conduit.

3,608,834
SHEET 1 OF 2
FIG. 1
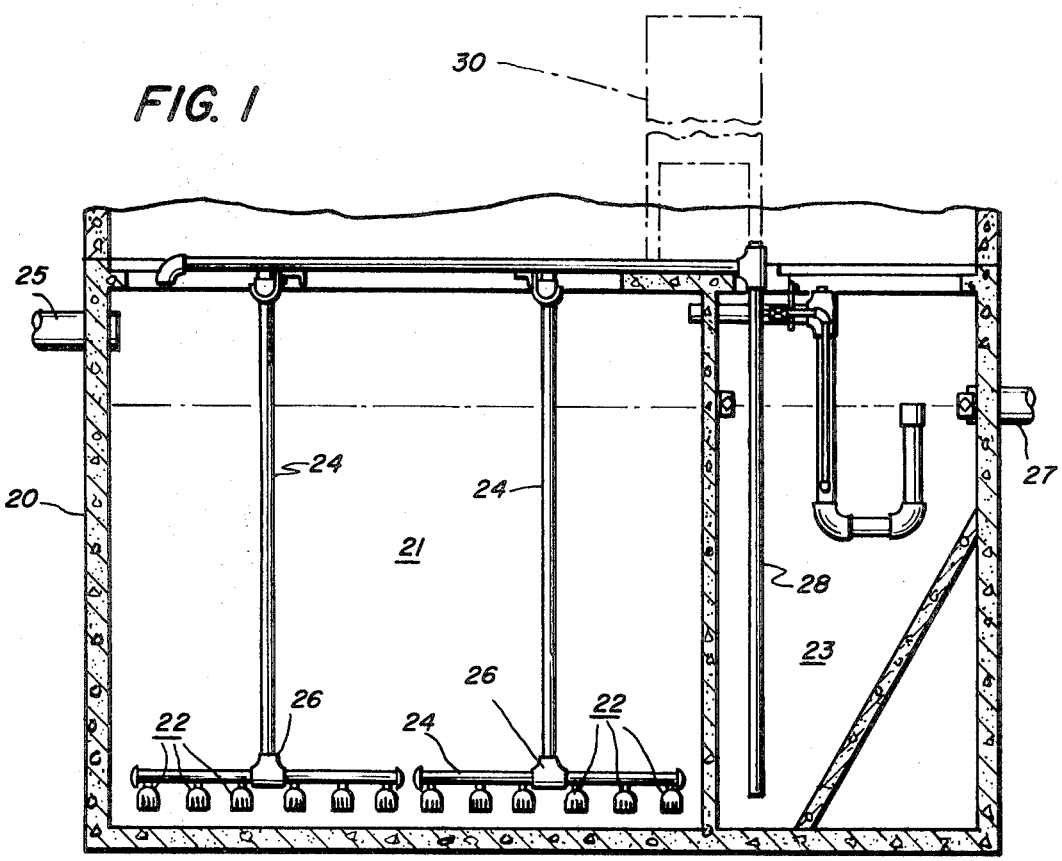
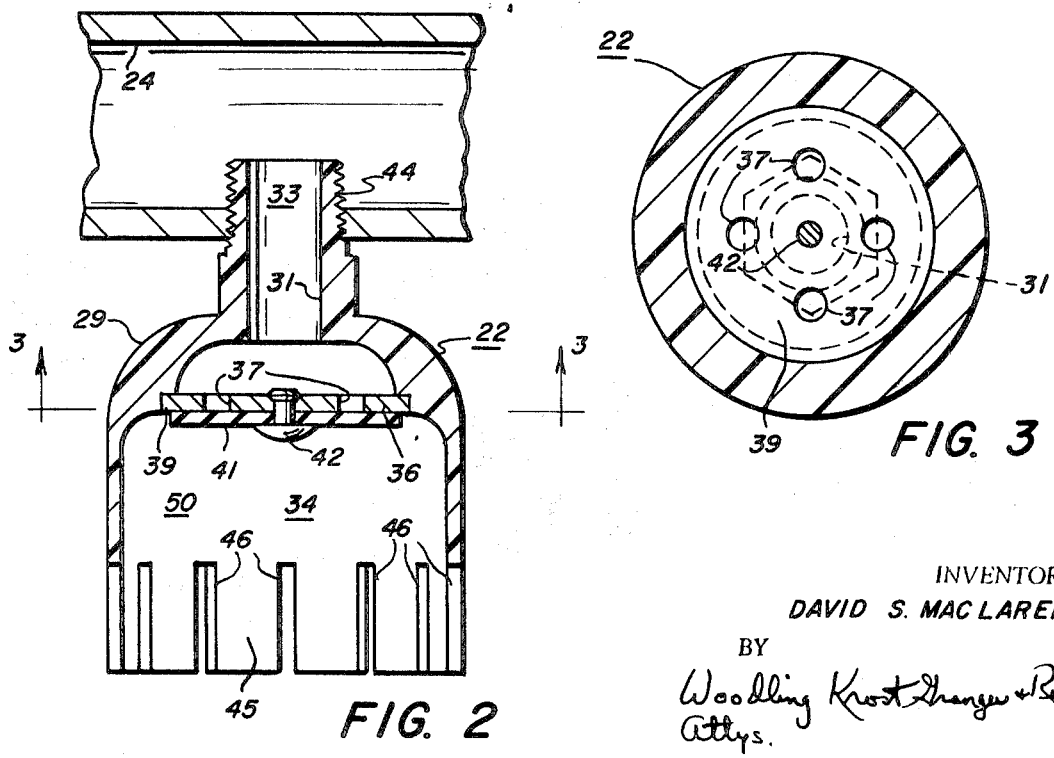
FIG. 2
FIG. 3
INVENTOR.
DAVID S. MAC LAREN
BY
Woodling Krost Granger & Rust
Attys.

INVENTOR.
DAVID S. MAC LAREN

GAS DIFFUSER

The present invention relates to the construction and use of air diffusers primarily utilized in the treatment of sewage in sewage treatment plants. The design might also be utilized in treating other liquid materials, however, herein it will be disclosed and discussed solely in conjunction with the treatment of liquid sewage. The present invention is utilized in introducing air and as a result oxygen into a treatment tank to support the life of aerobic bacteria that are utilized in this particular sewage treatment process. In order to appropriately carry out this process, a relatively large volume of oxygen must be supplied to the bacteria and it is preferred that the oxygen be provided in relatively small bubbles rather than in large ones, since this method more intimately mixes the oxygen with the liquid. These diffusers are preferably located in the bottom of the treatment tanks so that the oxygen will have a better chance of being absorbed by the liquids vehicle rising to the surface.

Many different types of diffusers have been utilized for accomplishing this end result and one of the simplest examples is the expedient of utilizing a pipe with a plurality of small drilled holes therein. In most treatment plants the introduction of air is intermittent with the air being turned on for some given period of time, say for example, 15 minutes, and then being turned off for a like period of time. It will thus be appreciated when the air is shut down and is not being forced out of the holes, that the liquids in the tank flow back into the pipe through the drilled openings to a point normally as high as the liquid level of the tank. When this happens, finely divided solids settle out of the liquids and accumulate in the openings and after months of cycling on and off, the accumulation of solids builds up to a point where the openings are clogged and the mechanism becomes inoperable.

Companies engaged in attempting to solve these particular problems have resorted to many expedients, among which includes the use of a tightly woven synthetic material about the openings which permits fine bubbles of air to be introduced into the liquids. Another expedient involves the use of small conical-shaped enclosures which have a number of small holes which release small bubbles of air from the cones. With the use of the synthetic material, the synthetic material tends to break down after continuous exposure to the sewage liquids, and in the case of the small cones, they tend to pick up small particles of material which tend to clog these openings.

It is therefore a desired object of the present invention to provide a diffuser which will introduce air into the sewage liquid in relatively small bubbles and when the cycling of the plant is such as to shut air off, it is desirable that a means be utilized which will prevent the sewage liquids from flowing back into the air supply conduits.

Other objects and a fuller understanding of this invention may be had by referring to the following description and claims, taken in conjunction with the accompanying drawings, in which:

FIG. 1 is a side elevational view of a sewage treatment tank with which the present invention is adapted to be utilized;

FIG. 2 is an enlarged elevational view partially in section of the gas diffuser of the present invention;

FIG. 3 is a view taken generally along the line 3—3 of FIG. 2;

Figure 4:
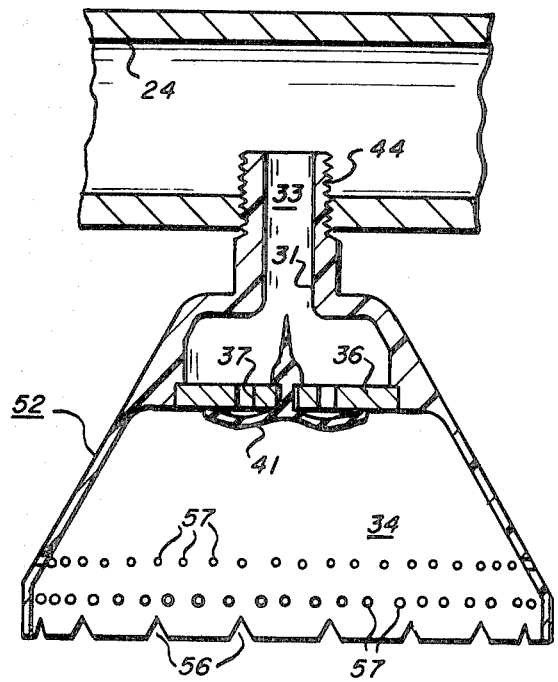
FIG. 4 is an elevational view of a modified form of the gas diffuser of the present invention; and, FIG. 5 is an elevational view of another modified form of the gas diffuser.

FIG. 1 of the drawings shown a sewage treatment tank 20 of conventional construction within which sewage is adapted to be processed and purified by the use of aerobic bacteria in a process well known to those skilled in the art. The tank 20 has a main treatment chamber 21 and a still chamber 23. Sewage enters through inlet 25 and the clarified liquid exits through an outlet 27. Any nontreated particles which manage to avoid treatment, travel to chamber 23 and are pumped back to chamber 21 for further treatment through pipe 28. As mentioned above the tank 20 is conventional in construction and will not be further described.

The air diffusers of the present invention are shown in the tank and each are identified generally by the reference numeral 22. In accordance with the hereinabove described process of sewage treatment, it is necessary that a relatively large volume of air be introduced into the sewage liquid and this is accomplished in the present invention by means of air supply conduits 24 which as will be noted extend vertically form the upper portion of the tank 20 and then by means of T-fittings 26 extend outwardly horizontally as shown. Air is supplied from a source 30.

Fig. 2 is an enlarged view of the horizontal portion of the air supply conduit 24 and shown in more detail the construction and operation of the air diffuser 22. The air diffuser per se includes a body member 29 which is provided with wall means which define an opening 31 which extends completely through the body member from an inlet side 33 to an exit side 34. Located in the opening 31 and extending generally at right angles thereto is a wall 36 which is provided with apertures 37 which provide for the passage of air through the wall 36. This construction comprises part of valve means wherein the valve seal is formed on the lower side 39 of the wall 36 and a valve member 41 is secured to the central portion of the wall by means of rivet 42 and is made of a plastic material, for example, polyvinyl chloride.

The inlet side of the body member is provided with threads 44 which constitute a means for attaching the body member to the air supply conduit 24 so that the body member is in gas-conducting relationship with the air supply conduit. The positioning of the body member within the tank 20 is such that the lower peripheral edge 45 of the body member at the exit side is located below the inlet side and generally resides in substantially a horizontal plane. The lower edge of the body member at the exit side is provided with a plurality of circumferentially spaced notches or slots 46 which provide for the exit of air under pressure and which have tendency to break the air, which is introduced into the opening 31, into small bubbles. These notches may be replaced by holes or may include both. For the purpose of identification and discussion, it can be said that the opening 31 between the valve member 41 and the tops of the slots forms a chamber identified by the reference numeral 50.

In operation and during the on cycle of the sewage plant, air pressure is pumped into the conduit 24 from service 30 which air subsequently passes into the inlet side 33 of the body member 29 and through the apertures 37. The force of the air under pressure bends the valve member 41 downwardly to cause the air under pressure to travel into the chamber 50 and it subsequently exits into the sewage liquid through the tops of the notches 46 into a plurality of small air bubbles which air bubbles thereafter travel upwardly through the sewage liquid.

When the on cycle of the plant is completed the air under pressure is shut off thereby resulting in a volume of air trapped in chamber 50 between the upper part of the notches 46 and the valve member 41. This along with the memory of the valve member 41 tends to keep the valve member closed. The trapped volume of air in chamber 50 and the valve member prevents the sewage liquid from traveling upwardly into the air supply conduit and prevents the problems discussed above which result therefrom.

Fig. 4 is an elevational view of a modified form of the air diffuser of the present invention and this air diffuser has been indicated by the reference numeral 52. The essential difference in the air diffuser 52 as compared to the diffuser 22 is the two rows of openings 57 in the exit side 34 of the diffuser. These openings are utilized in conjunction with notches 56, however, the notches 56 may be used without the openings 57 and the openings 57 may be utilized without the notches 56. In other respects, where the structure of the diffuser 52 is essentially the same as the diffuser 22, the same reference numerals have been used.

Figure 5:
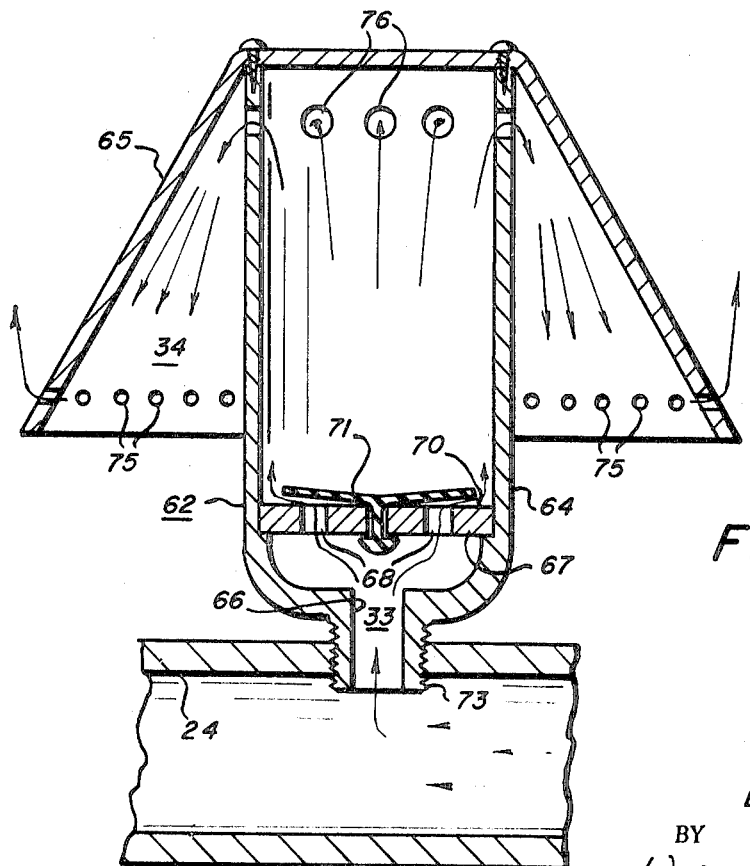

FIG. 5 illustrates an air diffuser 62 which differs in construction over diffusers 22 and 52 in that the exiting of air form the diffuser is at a position which is vertically higher in the sewage level than the inlet side of the diffuser. In this embodiment the structure of the diffuser 62 has been identified generally by new reference numerals. It will be seen that the diffuser 62 includes a body member 64 which has an inlet side 33 and an exit side 34. A skirt member 65 is attached to the body member as indicated to provide for a passage or opening 66 which extends form the inlet to the exit side. A wall 67 is positioned in the opening 66 between the inlet and exit sides and has a plurality of apertures 68 which extend therethrough. The upper side 70 of the wall 67 constitutes a valve seat and a valve member 71 is adapted to cooperated therewith to open and close the apertures 68. The body member 64 is provided with threads 73 which serve to attach the diffuser to the aid supply conduit 24. The peripheral edge of the skirt member 65 is provided with a plurality of openings 75 which provide for the exit of air from the diffuser. The air may also be exited around the lower peripheral edge of the skirt member.

In operation, air pressure within the supply conduit 24 passes through the apertures 68 by forcing the valve member 71 to open and air passes upwardly in the body member and out through holes 76 in the top thereof into the skirt member 65 and exits the skirt member through holes 75. When the air pressure is shut off, air is trapped in the upper portion of the body member above the valve 71 and within the skirt member so as to provide an air bubble which keeps the valve member isolated form the sewage in the tank. In principle of operation the embodiment of FIG. 5 is essentially the same as the embodiments of FIG. 2 and FIG. 4.

It will thus be seen from the use of the air diffuser of the present invention that air is supplied to sewage liquid in a manner which is highly desirable and that the sewage liquids are prevented form traveling into the air supply conduits thereby doing away with the previous problems of clogging of the air supply conduits by solids which settle out of the sewage liquids.

Although this invention has been described in its preferred form with a certain degree of particularity, it is understood that the present disclosure of the preferred form has been made only by way of example and that numerous changes in details of construction and the combination and arrangement of parts may be restored to without departing from the spirit and the scope of the invention as hereinafter claimed.

I claim:

1. The combination of a gas supply line and a gas diffuser for immersion in a liquid through which the gas is to be diffused comprising a body member having a longitudinal axis and having wall means defining a passage extending therethrough from an inlet opening side to an exit opening side, said passage from said inlet opening side to said exit opening side extending along the longitudinal axis, a planar wall member extending across said passage to define said inlet opening and exit opening sides, said inlet opening side including first and second wall portions, said first wall portion comprising a cylindrical opening communicating at one end with said gas supply line and at the other end communicating with said second wall portion, threaded means on said first wall portion attaching said first wall portion to said gas supply line, said second wall portion comprising a generally dish-shaped chamber, a plurality of spaced apertures extending through said planar wall member, a pressure-responsive flat elastically deformable valve member secured to said planar wall member and in a closed position covering said apertures and in an open position uncovering said apertures, said exit opening side comprising a generally cylindrically shaped chamber which extends beyond any portion of said deformable valve member, said last-mentioned chamber being larger than said dish-shaped chamber; whereby the presence of pressurized gas in said supply line and in said inlet opening side of said body member causes opening of said valve member and passage of gas to said exit opening side of said body member, and the absence of pressurized gas from said supply line causes closing of said valve member and trapping of a volume of gas in said cylindrically shaped chamber, the end of said cylindrically shaped chamber opposite said valve member being provided with a plurality of circumferentially spaced notches.